Sept. 19, 1967   F. C. CARROLL   3,342,277
CONDITION RESPONSIVE MECHANISM
Filed Oct. 5, 1964   5 Sheets-Sheet 1

INVENTOR.
FREDERICK C. CARROLL
BY
Thomas H. Grafton
ATTORNEY

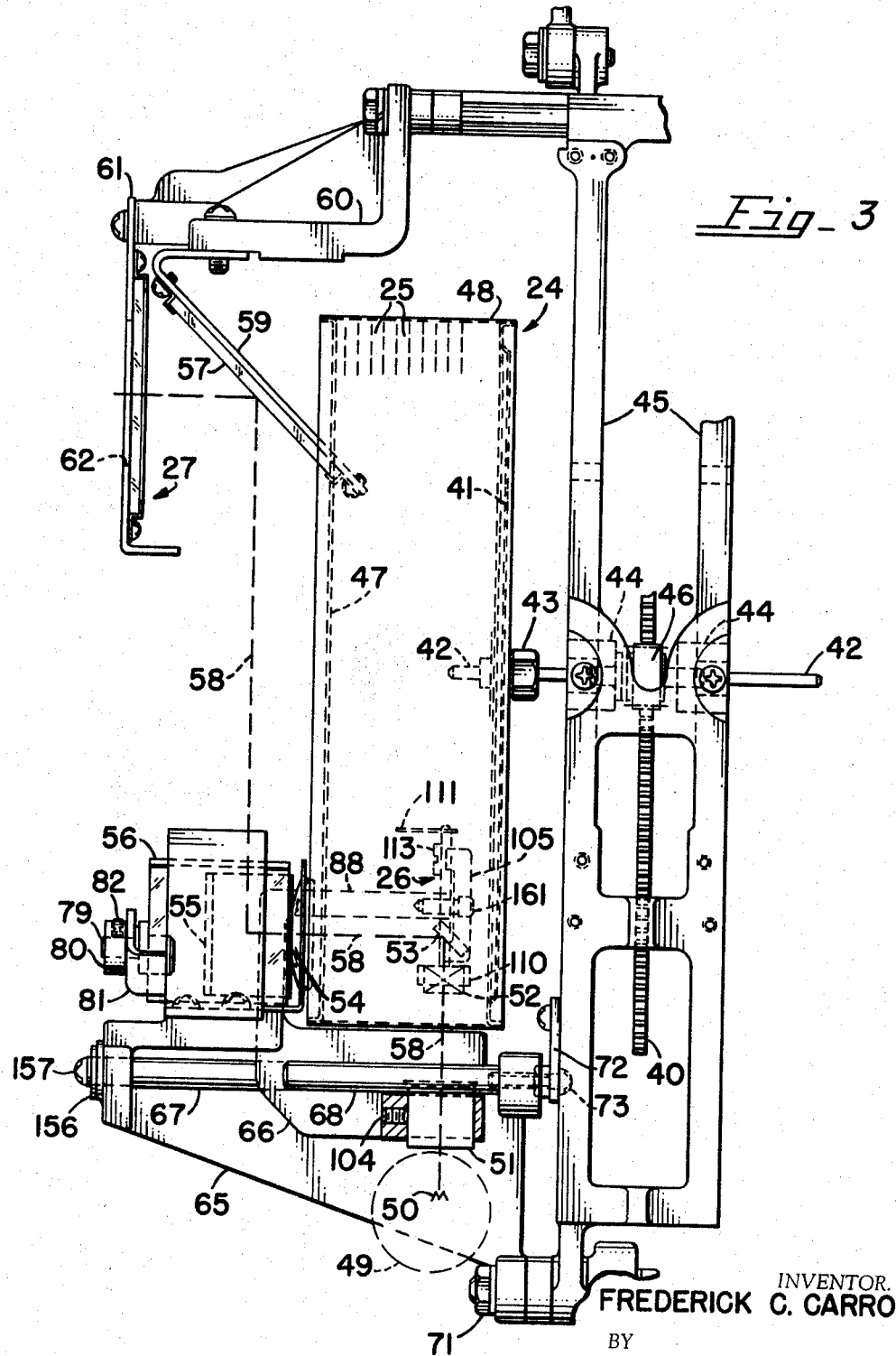

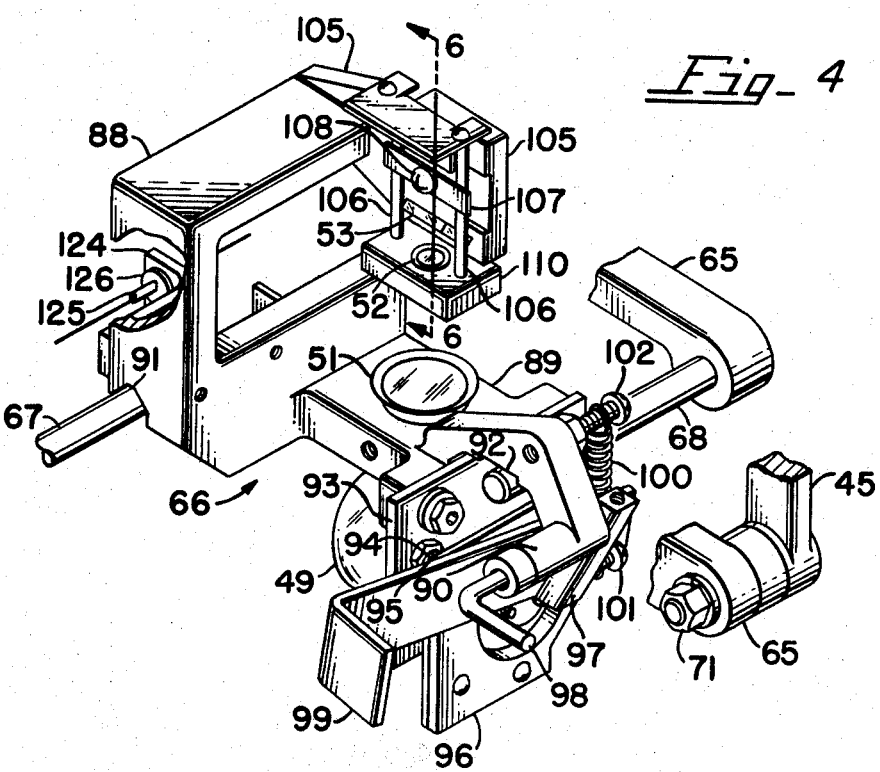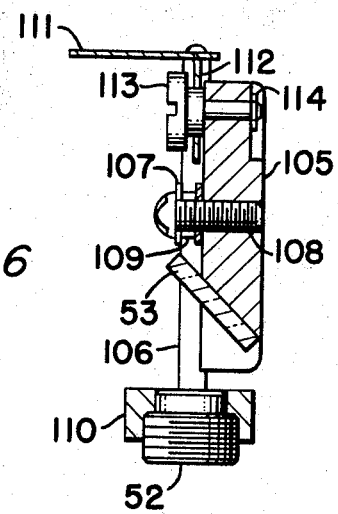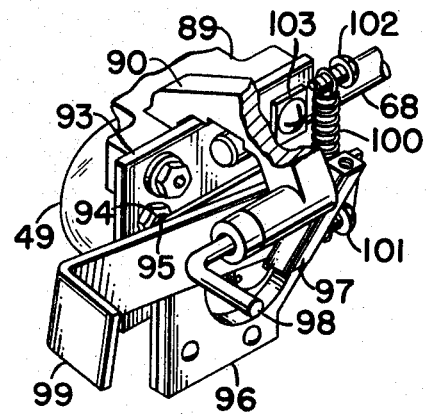

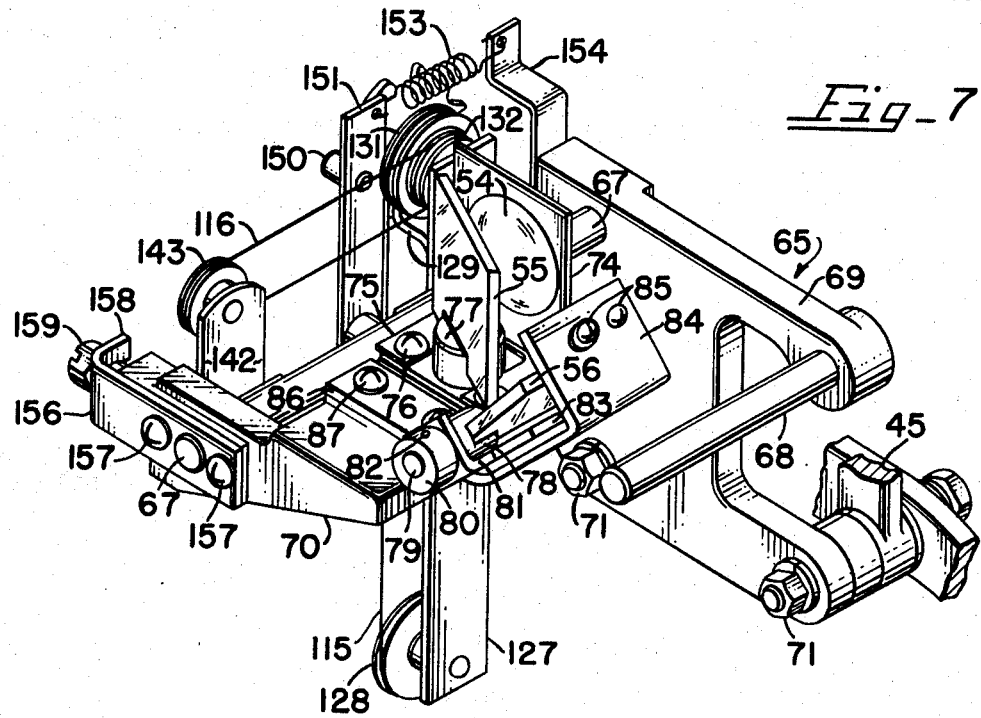
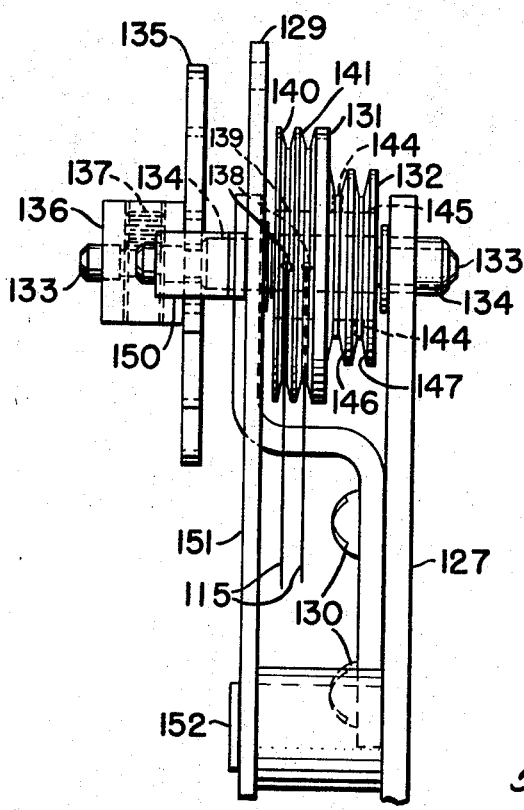

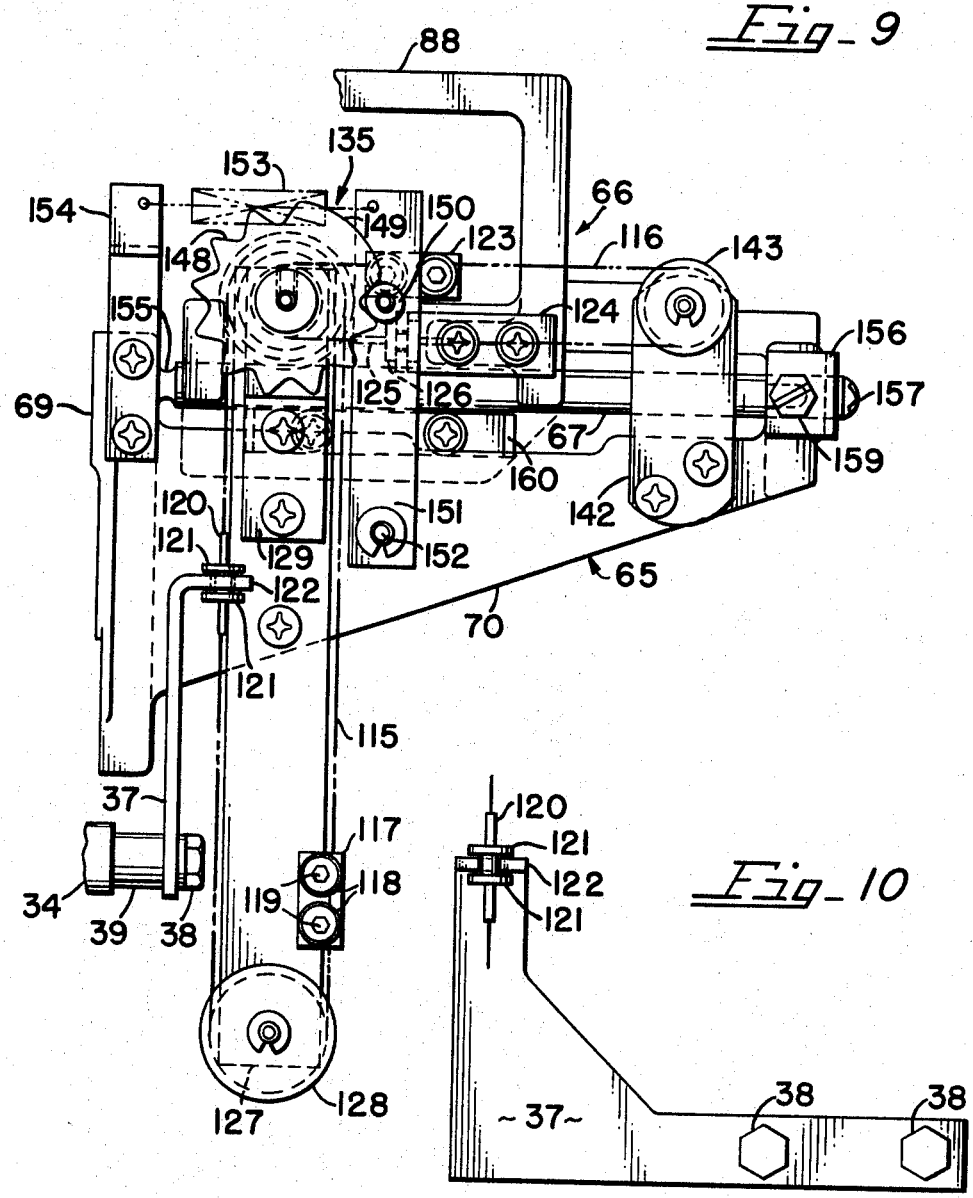

United States Patent Office 3,342,277
Patented Sept. 19, 1967

3,342,277
CONDITION RESPONSIVE MECHANISM
Frederick C. Carroll, Toledo, Ohio, assignor to Toledo Scale Corporation, Toledo, Ohio, a corporation of Ohio
Filed Oct. 5, 1964, Ser. No. 401,292
6 Claims. (Cl. 177—178)

This invention relates to weighing scales, and particularly to indicating mechanism therefor.

Heretofore it has been known in U.S. Patent No. 1,828,225 issued Oct. 20, 1931 to C. H. Hapgood to provide means for indicating at one place the sum of the weights of two or more portions of a load which are offset by different parts of the load-offsetting mechanism of a weighing scale, and, more specifically to provide a device for indicating as one number the sum of portions of a load offset respectively by automatic weighing mechanism and manipulative unit weight mechanism. Such indicating means includes two movable charts connected respectively to the automatic weighing mechanism and the manipulative unit weight mechanism and so related that the weight offset by the automatic mechanism, consisting, for example, of tens and units of pounds, appears as the terminal of a number, the figure in the hundreds place in the same number representing the weight offset by the manipulative weighing mechanism. An optical projection system is provided for projecting images of chart indicia onto a viewing screen. Since the charts are side by side, the image on the screen combines the indications of both charts which are in position to be projected. The prior indicating mechanism generally is unsatisfactory because there is a gap between the charts which appears as an even larger gap on the viewing screen when magnified by the optical projection system and because the manipulative unit weight mechanism so drives the unit weight chart through gearing that the two charts often are not aligned horizontally causing the numbers viewed on the screen to be misaligned. The manipulative unit weight mechanism is made heavy and rugged to function well in positioning the unit weights and, hence, its not ideal for precisely positioning a small chart.

An improvement on the device shown in the above patent is disclosed in U.S. Patent No. 1,437,517 issued Dec. 5, 1922 to H. O. Hem and filed after the filing date of the above patent. In place of the two charts shown in U.S. Patent No. 1,828,225, the device disclosed in U.S. Patent No. 1,437,517 utilizes a single chart bearing a plurality of columns of weight graduations, one column ranging from 0 to 1000 pounds, the second ranging from 1000 to 2000 pounds, etc. The chart is load responsive and a part of an optical projection system is positioned by the manipulative unit weight mechanism for indicating on a viewing screen as one number the sum of portions of a load offset respectively by automatic weighing mechanism and the manipulative unit weight mechanism. When the unit weights are manipulated, the optical projection system is shifted laterally along the chart, which is flat, to pick out that one of the columns which corresponds to the number of unit weights operatively connected to the weighing mechanism. This prior indicating mechanism also generally is unsatisfactory because the projected images shift along the viewing screen as the optical projection system is shifted laterally along the chart, i.e., the images of the several columns of weight graduations are not projected upon the screen at one place, and because the manipulative unit weight mechanism so drives the optical projection system through gearing that the optical projection system often is not properly aligned with the respective column of weight graduations. The manipulative unit weight mechanism is made heavy and rugged to function well in positioning the unit weights and, hence, is not ideal for precisely positioning an optical projection system.

Accordingly, the objects of this invention are to improve indicating devices, to improve load measuring devices, to increase the precision of such devices, to facilitate the mechanical adjustment of such devices, to provide improved means for indicating at one place the sum of the weights of a plurality of portions of a load on a weighing scale which are offset by different parts of load-offsetting mechanisms, to provide an optical projection system having an anti-zoom lens for indicating at one place such sum of the weights, the anti-zoom lens correcting focus and maintaining constant magnification, and to provide an improved drive for precisely positioning an optical projection system along a chart bearing columns of weight indicia to be projected.

One embodiment of this invention enabling the realization of these objects is an indicating mechanism in a weighing scale having a load-responsive cylindrical chart which bears circumferential columns of weight numbers and graduations. The indicating mechanism includes a stationary viewing screen and a projection lens which is movable along the chart in conjunction with movement of manipulative unit weight mechanism to pick out that one of the columns of weight numbers which corresponds to the number of unit weights operatively connected to the weighing mechanism and to project images of numbers and graduations onto the screen. The columns of weight numbers and graduations indicate weights in the first column ranging from 0 to 1200 pounds, in the second column ranging from 1000 to 2200 pounds, in the third column ranging from 2000 to 3200 pounds, etc. When no unit weights are in use, the projection lens sees first chart column, when one unit weight is in use, the projection lens sees such second chart column, etc. The sum of the weight of that portion of load upon the scale which is offset by the scale's automatic weighing mechanism and of the weight of that portion if any of load upon the scale which is offset by the manipulative unit weight mechanism is indicated at one place.

Many weighing scales are constructed which incorporate unit weights for increasing the load counterbalancing capacity of the scale without decreasing the sensitivity of indication given by the main scale indicator. An example of such a scale is disclosed in U.S. Patent No. 2,724,585 issued Nov. 22, 1955 to R. O. Bradley et al. This is accomplished by means of manually positionable unit weights which are placed on the weighing mechanism one at a time and each of which increases the capacity of the scale by a fixed amount. An auxiliary chart operated from the unit weight lifting mechanism provides indication of the load counterbalanced by the unit weights and the main scale indicator operated by automatic counterbalancing mechanism provides indication of the load counterbalanced by such automatic counterbalancing mechanism, the scale operator adding the two indications together to obtain the total weight of the load upon the scale.

In the embodiment of this invention, the conventional manipulative unit weight mechanism drives the projection lens along the cylindrical chart which is load responsive in the same manner as the main scale indicator in the scale disclosed in U.S. Patent No. 2,724,585 is load responsive. There are ten columns of weight numbers and graduations, one for no unit weight condition and nine for nine unit weights. When no unit weights are in use, the projection lens projects weight figures corresponding to load upon the scale. When unit weights are in use, the projection lens is shifted to the proper chart column and it projects weight figures corresponding to the total load upon the scale, even though part of the load is offset by the automatic counterbalancing mechanism and part of the load is offset by unit weights.

The projection lens is part of an optical projection system which includes an anti-zoom lens (positive spherical lens) which corrects focus and maintains constant magnification as the projection lens is shifted along the chart. The term "anti-zoom" is used to describe the constant magnification system in contrast to variable magnification optical systems using zoom lenses such as disclosed in U.S. Patent No. 3,027,805, issued Apr. 3, 1962 to Keizo Yamaji and in U.S. Patent No. 3,029,700 issued Apr. 17, 1962 to W. H. Price. An improved drive also is provided which connects the conventional manipulative unit weight mechanism to the movable part of the optical projection system. Operation of the unit weight mechanism produces a rough adjustment of the movable part of the projection system and a detent in such improved drive finally positions such movable part.

In accordance with the above, one feature of this invention resides in indicating at one place the sum of the weights of the two portions of the load which are offset by different parts of the scale's load-offsetting mechanism even though only a single chart is used.

Another feature resides in correcting the focus and maintaining constant magnification of the projected indication through the use of the anti-zoom lens.

Still another feature resides in the improved drive which precisely positions the movable part of the optical projection system including the projection lens along the cylindrical chart so that centered images are seen clearly on the viewing screen with no chance for mistake.

The above and other objects and features of this invention will be appreciated more fully from the following detailed description when read with refernce to the accompanying drawings wherein:

FIG. 3 is an enlarged, fragmentary and elevational view of the interior of the dial housing;

FIG. 4 is an enlarged, fragmentary perspective view of a selectively movable portion of the indicating mechanism which is shown in FIG. 3;

FIG. 5 is a fragmentary perspective view of a part of the device shown in FIG. 4, with a portion broken away to reveal details;

FIG. 6 is an enlarged, vertical sectional view taken along the line 6—6 of FIG. 4;

FIG. 7 is an enlarged, fragmentary perspective view of a stationary portion of the indicating mechanism which is shown in FIG. 3;

FIG. 8 is an enlarged, front elevational view of a portion of the mechanism which is illustrated in FIG. 7;

FIG. 9 is an enlarged, side elevational view of a portion of the mechanism which is illustrated in FIG. 7; and FIG. 10 is a front elevational view of a part of the mechanism which is shown in FIG. 9.

Figure 1:
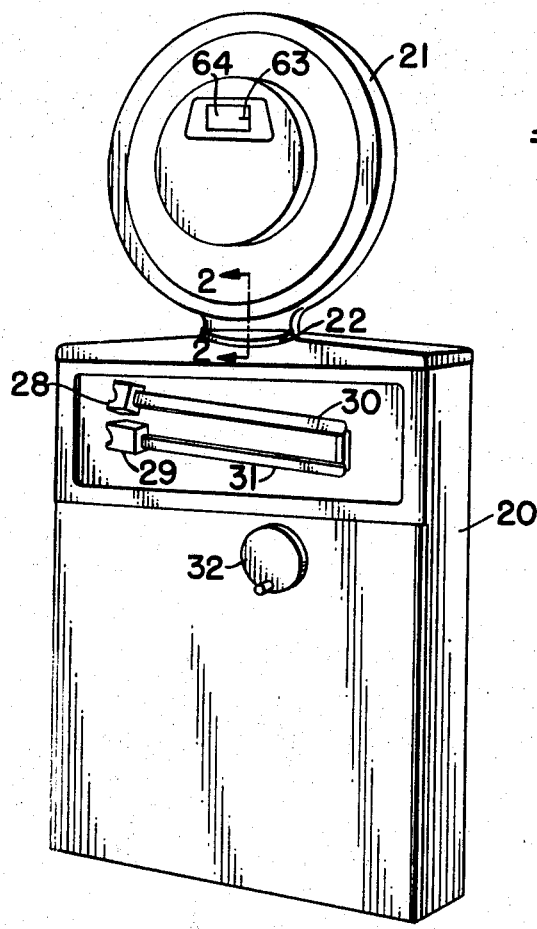
FIG. 1 is a perspective view of a unit weight cabinet and of a dial housing of a weighing scale having an improved indicating mechanism for indicating at one place the sum of the weights of two or more portions of a load.
Figure 2:
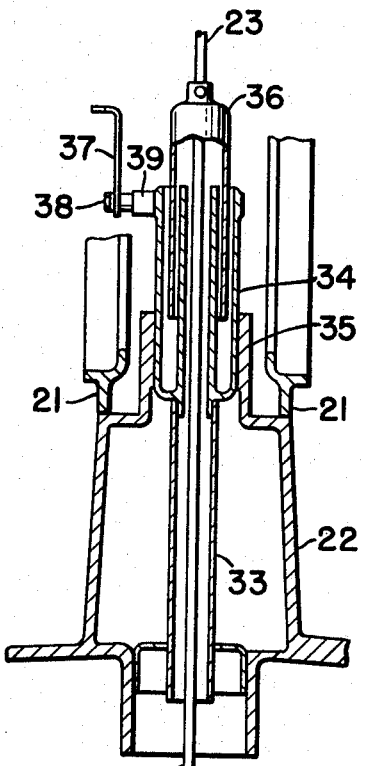
FIG. 2 is an enlarged, vertical sectional view taken along the line 2—2 of FIG. 1.

Referring to the drawings, a weighing scale embodying the invention includes a cabinet 20 surmounted by a dial housing 21 erected on a collar 22. A load receiving mechanism (not shown) is provided which includes the usual load supporting levers and load receiving platform. The load moment is transmitted to a rod 23 (FIG. 2) that extends upwardly into the dial housing 21 and is connected to automatic load counterbalancing mechanism as shown in the above U.S. Patent No. 2,724,585. In place of the indicator, which is shown in such patent, that cooperates with a series of indicia marked on the exposed face of a chart to indicate the weight of loads, there is provided a cylindrical chart 24 (FIG. 3) bearing ten circumferential columns or successive series 25 of weight indicia (numbers and graduations), one column ranging from 0 to 1200 pounds, the second ranging from 1000 to 2200 pounds, the third ranging from 2000 to 3200 pounds, etc. The chart 24 is load responsive and an optical projection system 26, part of which is positioned by manipulative unit weight mechanism, hereinafter described, is provided for indicating on a viewing screen 27 as one number the sum of portions of a load offset respectively by the automatic weighing mechanism and the manipulative unit weight mechanism. Tare weights are offset by means of movable poises 28 and 29 which are carried on tare beams 30 and 31 (FIG. 1).

The weighing scale incorporates mechanical unit weights for increasing the load counterbalancing capacity of the scale as disclosed in the above U.S. Patent No. 2,724,585. This is acomplished by means of manually positionable unit weights which are placed on the weighing mechanism one at a time by turning a handle 32 (FIG. 1) and each of which increases the capacity of the scale by a fixed amount. The unit weights are applied in combinations to provide nine increases to the capacity of the scale, each increase being provided by a 180 degree clockwise turn of the handle 32. For the purpose of indicating the amount of load on the platform offset by the unit weights, the handle 32 is operatively connected to a slidable sleeve 33, as shown in the above U.S. patent. An annular double-walled cup 34 forming part of an oil seal is slidable in a vertical bore 35 in the upper end of the collar 22. The bottom end of the annular cup 34 has a downwardly directed tenon that is fixed in the upper end of the sleeve 33. The annular cup 34 is moved up and down to a position that corresponds to the number of unit weights applied to the lever system. The movement of the annular cup 34 is employed to actuate the movable part of the optical projection system 26, as hereinafter described. The oil seal is completed by an inverted cup 36 that is supported on the rod 23 leading to the automatic load counterbalancing mechanism and that dips into the annular cup 34, the rod 23 extending centrally through the sleeve 33 and cups 34 and 36 so that the rod 23 and the sleeve 33 are movable independently of each other. Movement of the rod 23 rotates the chart 24 (FIG. 3) and movement of the sleeve 33 moves the movable part of the optical projection system 26, the sum of such movements of the rod 23 and the sleeve 33 being indicated in the form of a single weight reading in one place on the viewing screen 27. The sleeve 33 is connected to an arm 37 through the cup 34, there being two screws 38 connecting the arm 37 to the cup 34 and a spacer 39 separating the arm 37 from the cup 34.

The load responsive rod 23 is operatively connected to a rack 40 in the same manner as the corresponding rod is operatively connected to the rack as shown in the above U.S. Patent No. 2,724,585. The chart 24 includes a spider 41 which is like the spiders of the cantilever mounted chart shown in U.S. Patent No. 3,100,720 issued Aug. 13, 1963 in the name of F. C. Carroll and which is attached to a shaft 42 by means including a collet nut 43 like one of such spiders is attached to its shaft as shown in such patent. The shaft 42 is journaled in two bearings 44 carried in a frame 45 within the dial housing 21 and carries in turn a pinion 46 which meshes with the rack 40. The spider 41, hence, is responsive to load upon the scale in the same manner as the indicator hand is responsive to load upon the scale which is shown in the above U.S. Patent No. 2,724,585. The chart 24 also includes a second spider 47 in the form of a ring having the same diameter as the spider 41 and being connected to the spider 41 for concentric rotation about the axis of the shaft 42 by means of a thin indicia-bearing sheath 48. The spider 47 has the form of a ring to allow part of the optical projection system 26 to extend inside the chart 24 in an unobstructed path during rotation of the chart 24.

The indicia (figures and graduations) in columns 25, which are opaque, are printed on the sheath 48 while the sheath is flat, the indicia serving to indicate the weight of an article placed upon the scale. The sheath is made of any plastic or synthetic resin which is transparent, dimensionally stable relative to the material of the spiders with temperature changes, rigid enough when rolled into a cylinder to retain its cylindrical shape, and light enough to keep chart inertia to a practicable level. The plastic sheath is rolled and cemented to the spiders and has a cemented or welded seam, the ring spider 47 serving to keep the cylinder as a right cylinder. Accordingly, the cylindrical weight chart 24 is transparent and bears opaque indicia. Alternatively, the chart can be opaque and the indicia transparent to obtain projected weight indications. In a broader sense, the chart and the indicia have different degrees of transparency. The transparent chart 24 is part of the optical projection system 26 for obtaining projected weight indications.

The optical projection system 26 includes a light source 49 having a filament 50, a condenser 51, an objective or projection lens 52, a mirror 53, an anti-zoom lens (positive spherical lens) 54, mirrors 55, 56 and 57, and the viewing screen 27. The optical projection path or light beam is indicated by the numerals 58 in FIG. 3. The mirror 57 is clipped on a bracket 59 which is carried by a casting 60 that is carried in turn by the upper end of the frame 45 as shown in FIG. 3, the casting 60 functioning further to carry a bracket 61 to which the viewing screen 27 is clipped. Projected weight images are seen on the screen 27 through an opening 62 in the bracket 61, the screen 27 being made of glass having an emulsion coating on its outer side to make it translucent, with an index line 63 (FIG. 1) being printed on the emulsion coating. The screen 27 and its index line 63 are viewed through a glass window 64 (FIG. 1) in the dial housing 21, the dial housing 21 together with its window 64 being removed in FIG. 3 for clarity of illustration.

In the position shown in FIG. 3, the projection lens 52 is looking at the right hand one of the chart columns 25 because no unit weights are in use. This is the column in which the weight indicia range from 0 to 1200 pounds. In operation, the chart 24 is rotated in accordance with load upon the scale and the optical projection system 26 projects images of the chart indicia onto the screen 27 to be viewed through the window 64. When one unit weight is in use, the projection lens 52 and other movable elements of the optical projection system are shifted so that the projections lens sees the next chart column. This is the column in which the weight indicia range from 1000 to 2200 pounds. The normal capacity of the scale is 1000 pounds. If a 1500 pound load is placed upon the scale for example, the unit weight handle 32 is turned 180 degrees to crank on one unit weight which offsets 1000 pounds of load, the remainder of the load (500 pounds) being offset by the automatic load counterbalancing mechanism and the movable optical projection system elements are shifted automatically as described above so that the chart column in which the weight indicia range from 1000 to 2200 pounds is viewed by the projection lens. In the example cited, the chart 24 is rotated and stops in a position where the 1500 pounds figure is projected onto the viewing screen 27, i.e., the sum of the weight of that portion of load upon the scale which is offset by the scale's automatic weighing mechanism (500 pounds) and by the weight of that portion of load upon the scale which is offset by the manipulative unit weight mechanism (1000 pounds) is indicated at one place. The cranking on or off of unit weights so repositions the movable elements of the projection system that the correct sum of the weights of the two portions of a load which are offset by different parts of the load-offsetting mechanism is indicated at the one place.

The optical projection system 26 is supported partly on a stationary member 65 and partly on a carriage 66 which is slidable on two horizontal rods 67 and 68 carried by the stationary member 65. The stationary member 65, as best shown in FIG. 7, includes a vertically extending portion 69 and a horizontally extending portion 70. The vertically extending stationary member portion 69 is attached by means including nuts and bolts 71 to the bottom of the frame 45 and further is attached through a plate 72 (FIG. 3) carried by the frame 45 to the frame 45, a screw 73 attaching the vertically extending stationary member portion 69 to the plate 72. The vertically extending stationary member portion 69 carries the two horizontal rods 67 and 68. The horizontally extending stationary member portion 70 carries the positive spherical lens 54 and the mirrors 55 and 56 which are located outside of the cylindrical chart 24. The positive spherical lens 54 is mounted in an angle bracket 74 having horizontal slotted legs 75 which are held in adjustable position on the stationary member 65 by means of screws 76 which extend through the slots in the legs 75 and are threaded into the stationary member 65. The mirror 55 is mounted in a cylindrical element 77 having a tenon not shown which is received in a hole in the stationary member 65 and which is locked in place by means of a set screw (not shown). The mirror 55, thus, can be adjustably positioned about the vertical axis of the tenon. The mirror 56 also is mounted in a cylindrical element 78 having a tenon 79 which is received in a hole in a cylindrical element 80, that is fixed on a bracket 81, and which is locked in place by means of a set screw 82. The bracket 81 has a part 83 which extends underneath an upper part of a bracket 84 and which is bent over to receive two screws 85 which extend through slots in the bracket 84, having a horizontal leg 86 which is connected to the stationary member 65 by means of two screws 87.

The positive spherical lens 54 is adjustable toward and away from the mirror 55 in order to obtain the same size projected image figures at both ends of the chart 24. That is, when the projection lens 52 is located at the most right hand chart column 25, the projected images on the screen 27 are the same size as when the projection lens 52 is located at the most left hand chart column 25, provided the lens 54 is correctly adjusted. The mirror 55 is adjustable about the vertical tenon axis in order to obtain a centered image in the window 64 in a vertical direction. The mirror 56 is adjustable when the screws 85 are loose in order to obtain a centered image in the window 64 in a horizontal direction.

The carriage 66 which is slidable on the two horizontal rods 67 and 68 carried by the stationary member 65, as best shown in FIG. 4, includes a generally vertical extending portion 88 and a generally horizontally extending portion 89 having an arm 90. The carriage portion 88 defines a flat-bottomed V groove 91 and the carriage arm 90 defines a flat-bottomed groove 92, the grooves 91 and 92 receiving the respective rods 67 and 68 to be slidable thereupon. The carriage portion 89 carries a plate 93 which provides two sockets 94 (one shown) for the reception of two pins 95 (one shown) carried by a plate 96 which includes an ordinary bayonet connection for the light bulb 49. The pins 95 have a loose fit in the sockets 94 and are held in place by means of an over center toggle mechanism which includes a pivotably mounted arm 97 which is carried on the end of a handle 98 journaled in the carriage arm 90 and which has an end normally held in engagement with a bracket 99, connected to the plate 96, by means of a spring 100 connected between a screw 101 extending from the pivotable arm 97 and a screw 102 extending from the carriage arm 90. The bracket 99 functions as a handle. The pivotable arm 97 is pivoted out of engagement with the bracket 99 in opposition to the spring 100 by turning the handle 98 until the over center effect of the spring takes over, when it is desired to replace the light bulb 49. The handle portion of the bracket 99 then is grasped and the pins 95 are withdrawn from the sockets 94. This removes the bracket 99, the plate 96 and the bulb 49 as a unit. The bulb is replaced by another in the bayonet connection, the pins are replaced in the sockets, and the handle 98 is rotated in opposition to the over center spring 100 until the over center effect of the spring takes over to urge the lower end of the arm 97 into engagement with the bracket 99 and to hold the plate 96 carrying the bulb 49 accurately in place. The carriage arm 90 is shown partially broken away in FIG. 5 to reveal a right angle bracket 103 which is carried by the plate 93 and which has a holddown portion closely underlying the horizontal rod 68 for the purpose of limiting upward motion of the carriage 66 should an attempt be made to lift it off the rod 68. The carriage portion 89 defines a hole which receives the condenser 51, there being a set screw 104 (FIG. 3) provided to retain the condenser 51 in place.

The carriage portion 88 carries the projection lens 52 and the mirror 53. Two screws 161 (one shown in FIG. 3) connect a bracket 105 to the carriage portion 88. The bracket 105 carries two vertical rods 106 which are held against the bracket 105 by means of a spring plate 107 which is urged against the rods 106 by means of a screw 108 threaded into the bracket 105, there being a spacer 109 separating the spring plate 107 from the bracket 105. This provides a friction mounting for the two vertical rods 106 which are movable up and down but retain the position in which they are moved. The lower ends of the two rods 106 carry a block 110 (press fit) which serves as a mounting for the projection lens 52 (projection lens 52 cemented in mounting) and the upper ends of the two rods 106 carry a light deflector 111 (riveted to rods) which has a bent down portion 112 defining a hole that receives an eccentric 113 which is held in the bracket 105 by means of an E ring 114. The eccentric 113 is turned to move the objective 52 up or down to provide a focus adjustment. The mirror 53 is cemented on a surface provided for it on the bracket 105.

The light source 49, the condenser 51, the projection lens 52 and the mirror 53 make up the movable part of the optical projection system 26 which is carried by the carriage 66, as best shown in FIG. 4. The positive spherical lens 54 and the mirrors 55 and 56 make up part of the stationary part of the optical projection system 26 which is carried by the stationary member 65, as best shown in FIG. 7, the rest of the stationary part of the optical projection system 26, i.e., the mirror 57 and the viewing screen 27, being shown in FIG. 3. FIG. 3 shows the carriage 66 in place on the stationary member 65 with part of the carriage 66 extending within the chart 24 to locate the projection lens 52 and the mirror 53 within the chart 24. Light from the filament 50 is condensed by the condenser 51 and travels up through the transparent chart 24 to the projection lens 52, the mirror 53 directing the beam 58 to a location outside of the chart and the mirrors 55, 56 and 57 bending the light path as shown in FIG. 3 to direct the images onto the screen 27.

The carriage 66 is operatively connected through a cord drive (FIGS. 8 and 9) to the arm 37 which in turn is operatively connected to the unit weight handle 32 as hereinbefore described. Movement of the handle 32 drives the arm 37 as viewed in FIG. 9 up or down. The cord drive includes two endless cords, a vertical cord 115 and a horizontal cord 116. The vertical cord 115 has its two ends joined at a plate 117, the cord ends being pinched between the plate 117 and two washers 118 which are forced against the plate 117 by means of two screws 119 threaded into the plate 117, and is connected to the arm 37 by means of a connector that includes a tube 120 which is flattened to grip the cord and two rings 121 which normally are spaced either side of a bifurcated end 122 of the arm 37. The tube 120 and the rings 121 are one piece. This provides a loose connection between the cord 115 and the arm 37 as shown in FIGS. 9 and 10. The horizontal cord 116 has its two ends joined in a similar manner at a plate 123 which corresponds in function to the plate 117 and is connected to the carriage 66, through a bifurcated angle bracket 124 carried by the carriage 66, by means of a connector 125 which is like the connector made up of the tube 120 and rings 121, except, whereas the rings 121 are spaced from the bifurcated arm end 122 to provide a loose connection, the rings 126 of the connector 125 are tight against either side of the bifurcated end of the bracket 124 to provide a tight connection between the cord 116 and the bracket 124.

An elongated plate 127 is attached to the stationary member 65 which carries a rotatably mounted pulley 128 at its lower end and a bracket 129 at its upper end, the bracket 129 being connected to the plate 127 by means of two screws 130. The upper end of the bracket 129 is spaced from the upper end of the plate 127 to provide room for two double pulleys 131 and 132 (one piece) therebetween, the pulleys 131 and 132 being pressed on a shaft 133 journaled in bearings 134 one of which is pressed into the plate 127 and the other of which is pressed into the bracket 129. A detent wheel 135 also is attached to the shaft 133 through its hub 136, a set screw 137 fixing the hub 136 to the shaft. The double pulley 131 is provided with two radial holes 138 on opposite sides of the pulley which communicate with each other by way of an opening 139 in the pulley 131, the cord 115 being received in a first pulley groove 140, running into one of the holes 138, running through the opening 139, extending out of the other one of the holes 138, and then being received in a second pulley groove 141. This arrangement connects the cord to the pulley and makes possible a 360 degree rotation of the pulley 131 in contrast to the 180 degree rotation which is possible when an endless cord is fixed in the groove of a single-groove pulley. The cord 115 also runs around the single grooved pulley 128. Accordingly, up or down movement of the arm 37 drives the pulleys 131 and 132 and the shaft 133 which turns as one with the pulleys 131 and 132. Rotation of the shaft 133 turns the detent wheel 135.

A vertical plate 142 carries a rotatably mounted pulley 143. The double pulley 132 is provided with two radial holes 144 on opposite sides of the pulley which communicate with each other by way of an opening 145 in the pulley 132, the cord 116 being received in a first pulley groove 146, running into one of the holes 144, running through the opening 145, extending out of the other one of the holes 144, and then being received in a second pulley groove 147 to connect the cord to the pulley. The cord 116 also runs around the single grooved pulley 143. Accordingly, up or down movement of the arm 37 drives the pulleys 131 and 132 moving the cord 116 which drives the carriage 66 back and forth on the rods 67 and 68.

The detent wheel 135 has ten notches 148 and a stop portion 149, there being one notch 148 corresponding to the no unit weight position of the handle 32 (FIG. 1) and nine notches 148 corresponding to the nine different unit weight positions of the handle 32. A detent roller 150, carried on an arm 151 pivoted at 152 on the stationary member 65, is received in the detent notches 148. The roller 150, as shown in FIG. 9, is received in that one of the notches 148 which corresponds to the no unit weight position. The detent wheel 135 cannot be turned clockwise from its position shown in FIG. 9 because the stop portion 149 is against the roller 150 and can be turned counterclockwise from its position shown in FIG. 9 only until the other side of the stop portion 149 abuts the roller 150. The arm 151 is urged about its pivot 152 toward the detent wheel 135 by means of a spring 153 extending between the top of the arm 151 and a bracket 154 attached to the stationary member 65. When the detent wheel 135 rotates, the roller 150 is first forced out of a notch 148 in opposition to the spring 153 and then is driven into the next notch 148 by the spring 153.

The rod 67 on which the carriage 66 slides is necked down at 155 (FIG. 9) to provide an adjustment. The end of the rod 67, as best shown in FIG. 7, is received in an opening in an angle bracket 156 which is attached to the stationary member 65 by means of two screws 157 that extend through slots in the bracket 156 and which are threaded into the stationary member 65. An end 158 of the bracket 156 is received in a groove in a push-pull screw 159 threaded into the stationary member 65 which, when the screws 157 are loosened, functions to push or pull the bracket 156 and bend the rod 67 at its necked down part 155. Since the carriage V-groove 91 follows the rod 67, this adjustment varies the path of the carriage and, hence, the path of the projection lens 52. The rod 67 is bent until images of the zeros in all ten chart columns 25 are projected in alignment with the index 63 (FIG. 1). A hold-down bracket 160 (FIG. 9) is carried by the carriage 66 closely underneath the rod 67 for the purpose of limiting upward movement of the carriage 66.

The weighing scale, accordingly, utilizes a single cylindrical chart 24 bearing a plurality of circumferential columns of weight graduations, one column ranging from 0 to 1200 pounds, the second ranging from 1000 to 2200 pounds, etc. The chart is load responsive and a part of the optical projection system 26 is positioned relative to the chart by the manipulative weight mechanism, when the handle 32 is turned, for indicating on the stationary viewing screen 27 as one number in one place the sum of the portion of the load offset by the automatic weighing mechanism and the portion of the load offset by the unit weights.

One of the features of the invention resides in indicating at one place, i.e., in the window 64, the sum of the weights of the two portions of the load which are offset by different parts of the scale's load-offsetting mechanism even though only a single chart is used. In the prior indicating device disclosed in the above U.S. Patent No. 1,437,517 the projected images shift along the viewing screen as the optical projection system is shifted along the chart, i.e., the images of the several columns of weight graduations are not projected upon the screen at one place.

Another feature resides in correcting the focus and maintaining constant magnification of the projected indication through the use of the anti-zoom lens 54. Without the anti-zoom lens 54 in the optical projection system, changing the length of the optical path 58 (FIG. 3) by shifting the projection lens 52 along the chart 48 would change the focus and would cause the images seen in the window 64 to be of various sizes. The lens 54 is chosen to have optical properties such that, with reference to FIG. 3, moving the mirror 53, which directs the light beam 58 from the projection lens 52 to the anti-zoom lens 54, toward or away from the lens 54 has no effect on the focus and magnification of the images seen on the viewing screen 27.

Another feature resides in the cord drive which precisely positions the movable part of the optical projection system 26 along the chart 24 so that centered images are seen clearly on the viewing screen 27. A loose connection is provided between the cord 115 and the arm 37 at the bifurcated end 122 of the arm 37 as described above. A tight connection is provided between the cord 116 and the carriages 66 at the connector 125 as described above. If the manipulative unit weight mechanism drove the projection lens 52 directly, as disclosed in the above U.S. Patents Nos. 1,437,517 and 1,828,225, because the unit weight mechanism is heavy and rugged, the projection lens 52 would not be accurately located with respect to the chart columns 25 which are very narrow. In the cord drives shown in FIG. 9, operation of the unit weight mechanism produces a rough adjustment which can be varied slightly through the loose connection at the bifurcated end 122 of the arm 37. Then, a final adjustment automatically is made to finally position the carriage 66 carrying the projection lens 52 by means of the detent. When the detent wheel 135 rotates, the roller 150 is first forced out of a notch 148 in opposition to the spring 153 and then is driven into the next notch 148 by the spring 153 to move the carriage 66 slightly and, thus, finally position the carriage. The detent wheel 135 has ten notches 148, one for each chart column 25. When the roller 150 is received in a notch 148, the projection lens 52 looks at the center of a chart column 25.

Another feature resides in moving the projection lens 52 along the lower horizontal portion of the light path shown in FIG. 3. Shifting the projection lens 52 along or parallel to the axis of the chart 24 changes the length of the optical path 58 (FIG. 3). This is in contrast to a system in which a projection lens might be shifted along a line perpendicular to the system's optical axis holding the indication steady by using portions of the projection lens off of the optical axis of the lens reducing the brightness of the projected image and limiting practicable movement of the projection lens. For distortion free images, high light efficiency and unlimited projection lens movement, the system of the invention is so arranged that the projection lens is movable along the axis of the chart (changing the length of the optical path 58) so that the light path always goes through the optical axis of the lens. Motion of the projection lens which varies the length of the light path 58 would, if it were not for the anti-zoom lens 54 (or lens system), effect the focus and vary the magnification of the images seen on the viewing screen 27. The anti-zoom lens 54 (or lens system) and the projection lens 52 from a combined thick lens system having its own principal planes which are different from the planes of the lenses alone. Considering that one of the principal planes of the combined lens system which is closest to the object, i.e., the chart 24, as plane A and considering that one of the principal planes of the combined lens system which is closest to the image, i.e., the viewing screen 27, as plane B, then the ratio of the distance from plane A to the object and the distance from plane B to the image remains about constant when the projection lens is moved with respect to the anti-zoom lens, provided the value of the anti-zoom lens (or lens system) is correctly chosen, providing constant magnification. Accordingly, the anti-zoom lens corrects for motion of the projection lens which varies the light path 58.

The anti-zoom lens permits a relatively short total optical-path length from chart to screen because the anti-zoom lens uses an object which falls outside the viewing screen. Accordingly, moving the projection lens in the relatively long optical path using the anti-zoom lens produces less change in image size than such movement would in the relatively short optical path if the anti-zoom lens were not used. The principle of using two positive lenses in combination to produce a relatively short total optical-path length is shown and described in "Product Engineering" published Mar. 13, 1961 by McGraw-Hill Publishing Company on page 593 in connection with Example 3.

It is to be understood that the above description is illustrative of this invention and that various modifications thereof can be utilized without departing from its spirit and scope.

Having described the invention, I claim:

1. In a weighing scale, in combination, a load-responsive chart having successive series of indicia, a viewing screen, lens means including a projection lens for selectively projecting images of the indicia from each of the series along a projection path onto the same place on the screen, index means for the images serving to point out the images to be read, the index means having a constant size for all positions of the projection lens, said lens means further including stationarily mounted anti-zoom lens means for maintaining substantially constant magnification, whereby the images of the indicia on the screen are maintained in a substantially constant size relative to the index means for all positions of the projection lens.

2. In a weighing scale, in combination, a load-responsive chart having successive series of indicia, a viewing screen, lens means including a projection lens for selectively projecting images of the indicia from each of the series along a projection path onto the same place on the screen, index means for the images serving to point out the images to be read, the index means having a constant size for all positions of the projection lens, said lens means further including stationarily mounted anti-zoom lens means for maintaining substantially constant magnification, whereby the images of the indicia on the screen are maintained in a substantially constant size relative to the index means for all positions of the projection lens, the chart and the indicia having different degrees of transparency and the lens means including a carriage carrying the projection lens and a light source also carried by the carriage, the chart being so located between the light source and the projection lens that the projection path passes through the chart.

3. A weighing scale according to claim 1 wherein the lens means further includes adjustment means for changing the position of the stationarily mounted lens means along said projection path to obtain said substantially constant size in an initial adjustment.

4. A weighing scale according to claim 1 wherein the chart is rotatable about a generally horizontal axis and the projection lens is movable to vary the length of said projection path.

5. A weighing scale according to claim 2 wherein the chart is cylindrical and the projection lens is located inside the chart and the light source is located outside the chart.

6. In a weighing scale, in combination, a load-responsive chart having successive series of indicia, a viewing screen, lens means including a light source and a projection lens for selectively projecting images of the indicia from each of the series along a projection path onto the same place on the screen, the chart and indicia having different degrees of transparency, index means for the images serving to point out the images to be read, the index means having a constant size for all positions of the projection lens, said lens means further including stationarily mounted anti-zoom lens means for maintaining substantially constant magnification, whereby the images of the indicia on the screen are maintained in a substantially constant size relative to the index means for all positions of the projection lens, the chart being so located between the light source and the projection lens that the projection path passes through the chart.

References Cited

UNITED STATES PATENTS

| | | | |
|---|---|---|---|
| 1,880,415 | 10/1932 | Carroll | 88—24 |
| 2,541,365 | 2/1951 | Kauffman | 177—178 |
| 2,641,159 | 6/1953 | Mihalakis | 88—24 |
| 2,670,665 | 3/1954 | Caldwell | 95—4.5 |
| 3,181,447 | 5/1965 | Keznickl | 95—45 |

RICHARD B. WILKINSON, *Primary Examiner.*

G. H. MILLER, *Examiner.*

UNITED STATES PATENT OFFICE
CERTIFICATE OF CORRECTION

Patent No. 3,342,277 September 19, 1967

Frederick C. Carroll

It is hereby certified that error appears in the above numbered patent requiring correction and that the said Letters Patent should read as corrected below.

Column 11, lines 13 and 18, for the claim reference nunerals "1", each occurrence, read -- 2 --.

Signed and sealed this 5th day of November 1968.

(SEAL)
Attest:

Edward M. Fletcher, Jr.  EDWARD J. BRENNER
Attesting Officer  Commissioner of Patents